Patented Oct. 6, 1936

2,056,884

UNITED STATES PATENT OFFICE 2,056,884

ARTICLE OF MANUFACTURE

Byron C. Brunstetter, Washington, D. C., dedicated to the free use of the Public No Drawing. Application June 11, 1934,
Serial No. 730,074

2 Claims. (Cl. 99—100)

(Granted under the act of March 3, 1883, as
amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

I hereby dedicate the invention herein described to the free use of the public, to take effect upon the granting of a patent to me.

My invention covers the technique for making a new article of manufacture, namely, sweet potato chips which will tend to enhance the consumption of sweet potatoes, and will enable a large proportion of culls, otherwise wasted, to be utilized.

Sweet potatoes constitute the second largest vegetable crop in the United States. It is a crop notorious for a large percentage of culls due to the fact that the potatoes are either too large, too small or too irregular in shape for the market.

The steps of the process covered by my invention, hereinafter more fully described, are briefly as follows:

The sweet potatoes are first washed, then peeled, or preferably unpeeled, thinly sliced in any suitable manner, then fried in fat, dissolved to an oil, at a suitable temperature, for example, 284° F., for a period of from three to five minutes. While subjected to this temperature I recommend that the slices be agitated. The chips are then removed from this oil, and drained. Fried sweet potato chips may be salted after frying by sprinkling salt thereon.

The foregoing process is comparable with that used for making Irish potato chips, except for some very important differences; namely, the temperature; and the fact that the sweet potatoes require no peeling, nor is it necessary to wash the slices in water, as is required in the manufacture of Irish potato chips. In making Irish potato chips a temperature of 400° F. is the recommended temperature, although a temperature range of 410° F. to 364° F. may be employed. This temperature range, however, is too high, I have found, in the successful operation of my invention. As will hereinafter be shown, at 410° F. slices of sweet potatoes turn dark brown in less than a minute, and are inedible; at 350° F. cooked for a minute and a half the chips become an unattractive red color, and are of poor quality. Sweet potato slices subjected to a temperature ranging from 248°–302° F. become crisp in texture and attractive in color (light brown or golden-yellow, depending on the variety).

Sweet potatoes naturally contain from 1.4 to 4.0 per cent sugar before curing and from 4.5 to 9 per cent after curing and storage, whereas Irish potatoes contain soluble sugar varying from a half per cent to seven per cent only, as the result of storage at low temperatures.

Sweet potato chips made according to the process covered by my invention will retain the characteristic flavor of the sweet potato.

I have found that sweet potatoes may be classified generally into three classes with respect to their color, after frying, as follows:

Those which turn an even golden-yellow as when the "Porto Rico" or "Nancy Hall" variety is used;

Those which first turn a light yellow and then a light brown when white flesh varieties, as when "Red Brazil" and "United States Department of Agriculture Foreign Plant Introduction Numbers 22437 and 47443" are used; and, Those in which the yellow pigment is restricted to the region around the vascular bundles, and which tend to become mottled in appearance on frying, such as "Yellow Jersey" and "Yellow Strasbourg."

It is well known that when sweet potatoes after digging are stored at 85° F. for ten days they become "cured", a process which increases the sugar content, and decreases the content of polysaccharides and of water. In view of the fact that prompt curing of sweet potatoes is essential to protect them from fungous rots, I prefer the use of such products in the manufacture of sweet potato chips, but I do not restrict myself to that particular product. However, I do recommend as the preferred embodiment of my invention the use of sweet potatoes that have been subjected to a process which increases their sugar content.

The following tests illustrate the characteristics of the above-mentioned varieties in the practicing of my invention:

Test No. 1.—Sweet potatoes were thinly sliced, without peeling. The slices were fried in cottonseed oil, as were all the hereinafter tests, at a temperature ranging from 309° to 275° F. I found that there was no change in skin color or discoloration in the region of the skin. The cortex was a lighter yellow color than the rest of the slice. The chip was attractive in appearance upon being removed from the cooking unit, and after the excess oil had been drained off.

Test No. 2

| Thickness of slice | Time of frying | Temperature range | Color | Texture |
|---|---|---|---|---|
| Inch | Mins. | °F. | | |
| 1/16 | 4 | 288–261 | Golden-yellow. | 50% of the chips had small blisters. Crisp and curled. |
| 1/8 | 6½ | 306–280 | Brownish-yellow. | Greater crushing resistance than 1/16 in. 30% of the chips had very large blisters (not oil-filled). Chips were flat. |
| 3/16–¼ | 20 | 324–280 | Light brown. | No blisters. Chips "hard to crunch between teeth." Chips were flat. |

I found that the chips were limp when taken from the heated oil, but rapidly became crisp on cooling. Doubling the thickness of the slices about doubled the time required to drive the water out of the slices. With the very thick slices, not all the water was driven out after 20 minutes of frying; there were some soggy areas on a few of the chips after frying; and the chips were disagreeably difficult to chew, though of excellent flavor. Other tests of this nature have proven that slices $\frac{1}{32}$ inch thickness give chips which are too fragile, shattering easily; on the other hand slices of $\frac{1}{8}$ inch thickness give chips that are inclined to be somewhat hard.

Test No. 3.—Thickness of slice, $\frac{1}{16}$ inch

| Temperature of frying | Time of frying | Result |
|---|---|---|
| °F. 419–392 | 60 seconds | Very brittle; burnt odor; dark brown. |
| 392–369 | 75 do. | Caramelized odor. Brownish red, with light brown regions. |
| 374–351 | 75 do. | No odor; yellow in center, red around rim. |
| 354–336 | 75 do. | Much yellower color. Red not so prominent. |
| 327–311 | 90 do. | Yellow color, with traces of red. |
| 302–284 | 180 do. | Golden yellow; crisp. |
| 270–252 | 270 do. | Golden yellow; less crisp. |
| 239–219 | 16 minutes | Golden yellow; limp. |

This test shows that above 374° F., or below 248° F., unsalable chips are produced, and that from 374° F. to 302° F., an undesirable color effect results. I have found, therefore, the best temperature range is from 302° F. to 248° F. but I prefer the upper end of this temperature range. I have also found that when the temperature of frying is too high, the sugars in sweet potatoes are caramelized; when the temperature is too low, all of the water apparently is not driven off, even though the temperature is above the boiling point of water.

It is obvious that the higher the temperature of frying, the less time is required to drive the water out of the slices of sweet potatoes, and conversely the lower the temperature of frying the more time is required to drive out the water.

Test No. 4.—Thickness of slice, $\frac{1}{16}$ inch

| Temperature of frying | Time of frying | Result |
|---|---|---|
| °F. 298–289 | Mins. 1.5 | Golden yellow color. Some slices lacked crispness. |
| 306–289 | 3.0 | Golden yellow, with very slight reddening. Crispness and texture excellent. |
| 306 | 4.5 | Most of the slices showed definite reddening. |
| 306–302 | 7.0 | Reddish brown. |
| 306–302 | 10.0 | Do. |

This test shows that at a frying temperature otherwise suitable, too long a time of frying causes chips to become undesirable from a color standard.

Test No. 5.—Slice thickness, $\frac{1}{32}$ to $\frac{1}{16}$ inch

| Time elapsing between slicing and frying | Temperature range in frying | Time of frying | Color of chips |
|---|---|---|---|
| | °F. | Seconds | |
| 15 seconds | 367–340 | 120 | Brownish-yellow with many red blotches. |
| 4.5 minutes | 311–284 | 150 | Golden-yellow with trace of red. |
| 15 seconds | 293–275 | 180 | Golden-yellow. |

Test No. 6.—Slice thickness, $\frac{1}{32}$ to $\frac{1}{16}$ inch. Slices spread out; oxidation apparent within five minutes.

| Time elapsing between slicing and frying | Temperature range in frying | Time of frying | Color of chips |
|---|---|---|---|
| Minutes | °F. | Mins. | |
| 5 | 297–289 | 3 | Golden-yellow. |
| 18 | 300–288 | 3 | Do. |
| 28 | 297–291 | 3 | Do. |
| 42 | 291–282 | 3 | Do. |
| 60 | 291–282 | 3 | Do. |

The above two tests (5 and 6) illustrate the fact that any color change, due to oxidation, in sliced sweet potatoes have little or no effect on the color of the fried chips.

The 60 minute chips had an excellent flavor. The effect of increasing the time elasping between slicing and frying caused the chips to come oilier and less oil drained from them.

Test No. 7.—Slice thickness, $\frac{1}{16}$ inch. Tubers were peeled, sliced quickly and plunged at once into cottonseed oil at 356° F. Within thirty seconds the temperature dropped below 284° F. (Note: the initial temperature may be high without harmful results to the chip, provided the temperature of the fat after the expulsion of water is below 302° C.) The slices were fried approximately six minutes. The chips were a light golden brown; the texture was crisp, even, with no blisters. The taste was sweet, with a pronounced nutty flavor.

After draining for 48 hours, samples were placed in two tared weighing bottles and weighed; in one bottle the chips were unbroken, in the other each chip was broken one or several times. The chips were stored in a desiccator over water at 86° F., simulating rainy hot summer weather. After 72 hours, the chips had become limp, they could be bent without breaking; the color remained excellent. The increase in the weight of the unbroken chips was 14.4 per cent, while the broken chips increased 13.6 per cent in weight.

The chips were then stored in a balance case at room temperature, with the lids of the weighing bottles off.

| Day | Percent of original weight | |
|---|---|---|
| | Unbroken chips | Broken chips |
| First | 105.7 | 105.8 |
| Second | 104.2 | 104.2 |
| Third | 103.8 | 103.7 |
| Fourth | 103.4 | 103.3 |
| Eleventh | 103.0 | 102.9 |
| Thirty-fifth | 104.4 | 104.2 |

The above figures show that the chips quickly recovered from their soggy condition and progressively lost weight by losing water. Ten days after frying the color and odor of the chips were excellent; the texture was crisp.

I have also found that fried sweet potato chips may, if desired, be candied to produce an excellent confection. If such be desired the following example is cited as illustrative of practicing my invention:

The sweet potatoes are washed, sliced thin, fried, and then immersed for a suitable period of time, for example, a minute in heated boiling sugar syrup. This syrup may be or may not be salted and dextrine may or may not be added thereto. After draining the chips, which have become limp as a result of the treatment, they are placed in an oven and subjected to the action of dry heat until crispness results. The temperature of the oven, or any other suitable heating unit, should be between 266° F. and 284° F. The time they should be subjected to this heat is approximately 30 minutes. Slight overheating, however, does not make the article objectionable since it imparts a caramel flavor.

Although thinly sliced sweet potatoes may be candied as above described without first frying, I prefer to candy the slices after frying. Another method for practicing my invention is as follows:

The sweet potatoes are washed and sliced thinly; the slices are then immersed in water held at 158° F. to 176° F. for a period of substantially five minutes. This heat treatment has the effect of destroying the semi-permeability of the walls of the cells by which the free diffusion of salts and sugars is prevented. After the heat treatment, soluble sugars can freely diffuse out of the cells, and the dissolved salt is free to diffuse into the cells. This water may contain salt of a suitable concentration, such as one per cent, which is free to enter the cells after the semi-permeability has been destroyed. The slices may then be lifted out, drained and fried. If desired, however, the unsalted slices of sweet potatoes, after the above heat treatment, may be salted by immersion at room temperature for substantially five minutes in a salt solution of suitable concentration, such as one per cent. contained in a separate container.

Although my invention has been described with particularity as to detail it will, of course, be understood that the methods shown can be modified considerably without departing from the spirit of my invention.

Having thus fully described my invention, what I claim for Letters Patent is:

1. In the preparation for market of sweet potato chips, the process, which comprises washing the sweet potatoes; thence slicing them; thence subjecting the said slices to the action of fat, heated to a temperature ranging from 248° F. to 302° F., for a period of substantially eight minutes.

2. In the preparation for market of sweet potato chips, the process which comprises washing sweet potatoes; thence slicing them; thence subjecting the said slices to the action of fat, heated to a temperature ranging from 248° F. to 302° F., for a period of substantially eight minutes; thence draining off the excess fat; and, thence subjecting the said slices to the action of boiling sugar syrup, having salt and dextrine added thereto, for a period of substantially one minute.

BYRON C. BRUNSTETTER.